(12) United States Patent
Kuo et al.

(10) Patent No.: US 8,892,067 B2
(45) Date of Patent: Nov. 18, 2014

(54) METHOD OF DISPLAYING FITNESS DATA AND RELATED FITNESS SYSTEM

(75) Inventors: Juhang Kuo, San Dimas, CA (US);
Clark Weber, San Dimas, CA (US);
Anthony Pelosi, San Dimas, CA (US);
Mike Maxson, San Dimas, CA (US);
Anthony Eng Huat Lim, San Dimas, CA (US)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 30 days.

(21) Appl. No.: 13/615,559

(22) Filed: Sep. 13, 2012

(65) Prior Publication Data
US 2014/0073282 A1 Mar. 13, 2014

(51) Int. Cl.
*H04M 11/04* (2006.01)
(52) U.S. Cl.
USPC ............................................ 455/404.2; 705/2
(58) Field of Classification Search
CPC ................. A61N 1/36021; A61B 5/14532
USPC ............ 340/539.12, 870.07, 573.1; 600/301, 600/365, 323, 300, 500, 479; 705/2, 3, 4; 455/419, 404.2
See application file for complete search history.

(56) References Cited

U.S. PATENT DOCUMENTS

| 2006/0152373 A1* | 7/2006 | King ........................ 340/573.1 |
| 2008/0139907 A1* | 6/2008 | Rao et al. ..................... 600/323 |
| 2008/0246629 A1* | 10/2008 | Tsui et al. ................ 340/870.07 |
| 2009/0273467 A1* | 11/2009 | Elixmann et al. ........ 340/539.12 |

* cited by examiner

*Primary Examiner* — Kiet Doan
(74) *Attorney, Agent, or Firm* — Winston Hsu; Scott Margo

(57) ABSTRACT

A method of displaying fitness data on a portable electronic device in communication with a mobile phone includes storing a database in a memory of the mobile phone, the database including geographic data, receiving, with the mobile phone, position signals indicating a current position of the mobile phone, and generating fitness data on the mobile phone according to position signals received by the mobile phone over time. The method also includes transmitting a request from the portable electronic device to the mobile phone for requesting fitness data to be sent from the mobile phone to the portable electronic device, the portable electronic device being separate from the mobile phone, transmitting requested fitness data from the mobile phone to the portable electronic device in response to the request received by the mobile phone, and displaying the requested fitness data on a display of the portable electronic device.

21 Claims, 14 Drawing Sheets

| 12:58 PM | ⟨Sensor icons⟩ 112 |
|---|---|
| Dist | 3.00 mi |
| Time | 21:45 |
| Avg pace | 7:15 /mi |

FIG. 7

| 12:58 PM | ⟨Sensor icons⟩ 116 |
|---|---|
| Dist | 3.00 mi |
| Time | 21:45 |
| Avg pace 7:15 /mi | Elev 155 ft |

METHOD OF DISPLAYING FITNESS DATA AND RELATED FITNESS SYSTEM

BACKGROUND OF THE INVENTION

1. Field of the Invention

The invention relates to a fitness system, and more particularly, to a fitness system for displaying fitness data on a first portable electronic device in communication with a first mobile phone.

2. Description of the Prior Art

With the increasing popularity of mobile phones, also known as cellular phones or cell phones, has brought added functionality to many popular mobile phones. Mobile phones with added functionality, such as so called "smart phones", have dramatically risen in popularity recently and allow users to perform a variety of tasks no matter where the user is located. Since many mobile phones now come with a Global Positioning System (GPS) receiver, the mobile phones can be used to track the user's position as the user moves about, as well as to provide the user with simple navigation instructions.

Due to the wide range of functions available in mobile phones, many users have begun carrying the mobile phones with them as they exercise. In order to gain a better idea of how much or how fast a user is exercising, the user can run fitness applications on the mobile phone to calculate a route taken by the user, a distance traveled, as well as a speed at which the user is moving.

In order to see fitness data while the user is exercising, the user must take out the mobile phone and turn on the display of the mobile phone. Only then can the user obtain current fitness data. Unfortunately, having to take out the mobile phone and turn on the display while the user is exercising causes great inconvenience to the user, and may interrupt the user's workout. Due to the fact that the user does not have a convenient way to occasionally glance at current fitness data without interrupting the user's workout, an improved system of monitoring fitness data is clearly needed.

SUMMARY OF THE INVENTION

It is therefore one of the primary objectives of the claimed invention to provide a fitness system and a method of displaying fitness data on a first portable electronic device in communication with a first mobile phone.

According to an exemplary embodiment of the claimed invention, a method of displaying fitness data on a first portable electronic device in communication with a first mobile phone is disclosed. The method includes storing a database in a memory of the first mobile phone, the database comprising geographic data, receiving, with the first mobile phone, position signals indicating a current position of the first mobile phone, and generating fitness data on the first mobile phone according to position signals received by the first mobile phone over time. The method also includes transmitting a request from the first portable electronic device to the first mobile phone for requesting fitness data to be sent from the first mobile phone to the first portable electronic device, the first portable electronic device being separate from the first mobile phone, transmitting requested fitness data from the first mobile phone to the first portable electronic device in response to the request received by the first mobile phone, and displaying the requested fitness data on a display of the first portable electronic device.

According to another exemplary embodiment of the claimed invention, a fitness system is disclosed. The fitness system includes a first mobile phone comprising a memory storing a database comprising geographic data, a position receiving device receiving position signals indicating a current position of the first mobile phone, and a processor generating fitness data according to position signals received by the position receiving device over time. The fitness system also comprises a first portable electronic device being separate from the first mobile phone. The first portable electronic device comprises a user interface issuing a request for fitness data to be sent from the first mobile phone to the first portable electronic device, and a display for displaying requested fitness data after the requested fitness data is transmitted from the first mobile phone to the first portable electronic device in response to the request issued by the user interface.

It is an advantage that the present invention can check current fitness data on the first portable electronic device without needing to take out and turn on the display of the first mobile phone. This provides a more convenient way for the user to monitor fitness data without interrupting the user's workout.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7 is a screen on the first portable electronic device that shows three fields of fitness data.

FIG. 8 is a screen on the first portable electronic device that shows four fields of fitness data.

DETAILED DESCRIPTION

Figure 1:
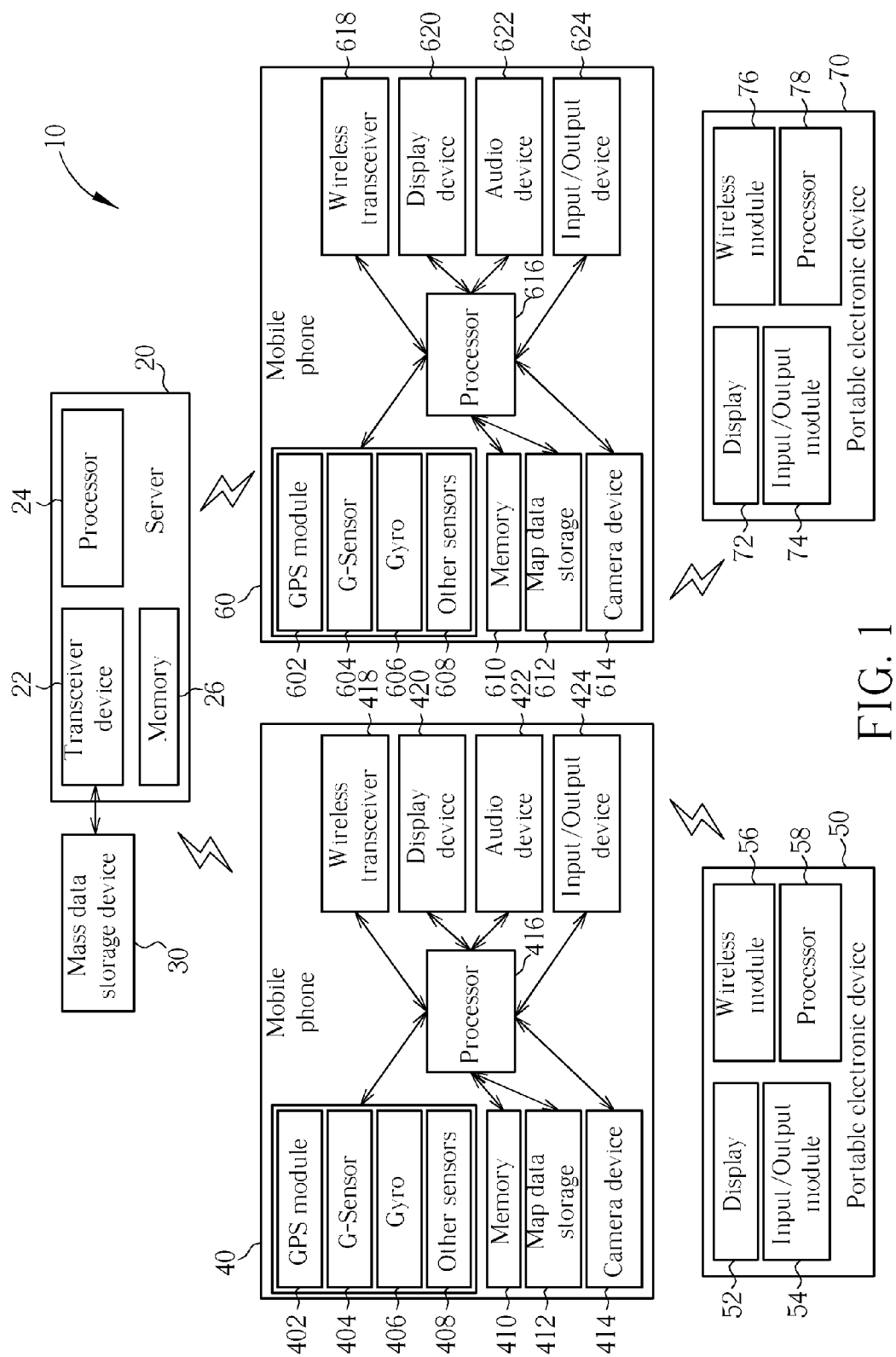
FIG. 1 is a block diagram of a fitness system according to the present invention.

Please refer to FIG. 1. FIG. 1 is a block diagram of a fitness system 10 according to the present invention. The fitness system 10 contains a first mobile phone 40 in communication with a first portable electronic device 50. The fitness system 10 may also include a second mobile phone 60 in communication with a second portable electronic device 70. The first portable electronic device 50 and the second portable electronic device 70 can communicate with one another through the first mobile phone 40 and the second mobile phone 60. The first mobile phone 40 and the second mobile phone 60 can either communicate with one another directly, or can communicate with each other via a server 20.

The server contains a transceiver device 22 for communicating with the first mobile phone 40, the second mobile phone 60, and an optional mass data storage device 30. The mass data storage device 30 can store data such as a user database containing a list of users that make use of the server 20 for storing fitness data, a fitness database containing the fitness data for various users, alarm events for storing a record of any alarms activated by any of the users, as well as other user configuration data that the users use to customize their fitness applications. The mass data storage device 30 can be located external from the server 20 or can be located inside the server 20 as internal storage. The server 20 also comprises a processor 24 for controlling operation of the server 20 and a memory 26 for storing applications and related data being executed by the processor 24 of the server 20.

The first mobile phone 40 comprises a GPS module 402, a gravity sensor 404, a gyroscope 406, or other sensors 408. A memory 410 is used for storing applications and related data being executed by a processor 416. A map database 412 contains map data and points of interest for aiding a user of the first mobile phone 40 in navigation. A camera 414 allows a user to take photographs while on the go. A wireless transceiver 418 allows the first mobile phone 40 to wirelessly communicate with both the server 20 and the first portable electronic device 50. The wireless transceiver 418 can support communication using one or more of the following protocols including cellular communication, WiFi (IEEE 802.11) communication, Bluetooth communication, Bluetooth Low Energy (BLE) communication, ANT+ wireless communication, or 3G communication. The first mobile phone 40 contains a display device 420 that may be a touch-sensitive display, an audio device 422 such as a speaker or audio output port, and an input/output device 424 for serving as the user interface of the first mobile phone 40.

The first portable electronic device 50 includes a display 52 which may be a touch-sensitive display, an input/output module 54 for serving as a user interface of the first portable electronic device 50, a wireless module 56 for wirelessly communicating with the first mobile phone 40, as well as a processor 58 for controlling operation of the first portable electronic device 50. The wireless module 56 may support communication using WiFi (IEEE 802.11) communication, Bluetooth communication, Bluetooth Low Energy (BLE) communication, or ANT+ wireless communication, but BLE and ANT+ communication are preferred due to their low power needs which would extend the life of the first portable electronic device 50 before needing to recharge power. The input/output module 54 may include a microphone and speaker as well as other input options.

The second mobile phone 60 may be different or identical to the first mobile phone 40. The second mobile phone 60 may have a GPS module 602, a gravity sensor 604, a gyroscope 606, or other sensors 608. The second mobile phone 60 may also have a memory 610, a processor 616, a map database 612, a camera 614, a wireless transceiver 618, a display device 620, an audio device 622, and an input/output device 624 for serving as the user interface of the second mobile phone 60.

The second portable electronic device 70 may be different from or identical to the first portable electronic device 50. The second portable electronic device 70 may include a display 72, an input/output module 74, a wireless module 76, and a processor 78.

Figure 2:
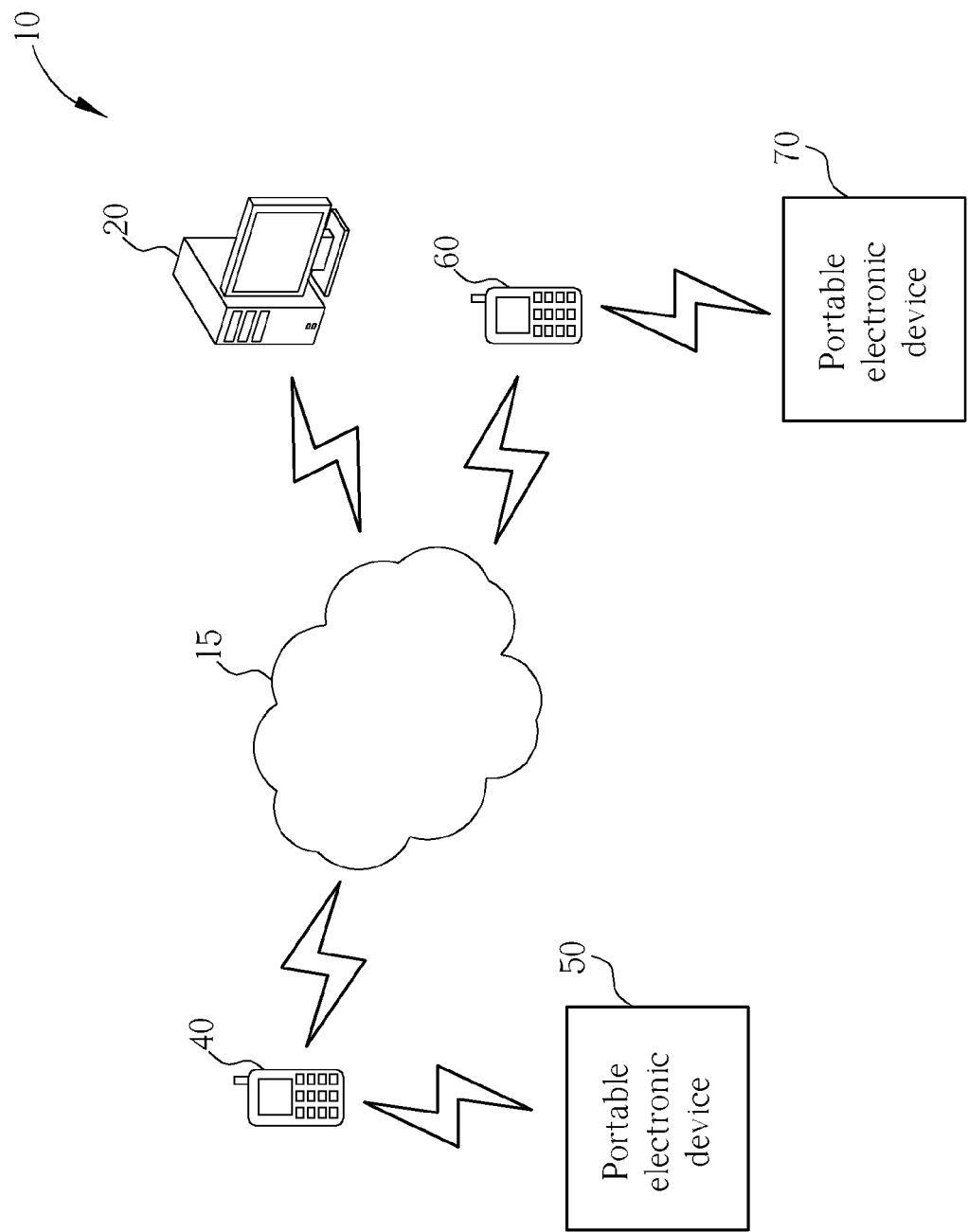
FIG. 2 is a diagram showing communication between elements of the fitness system.

Please refer to FIG. 1 and FIG. 2. FIG. 2 is a diagram showing communication between elements of the fitness system 10. The first mobile phone 40 and the second mobile phone 60 may communicate with the server 20 via a connection to the internet 15. In order for the first portable electronic device 50 to send data to or receive data from the second portable electronic device 70 the first portable electronic device 50 must communicate with the first mobile phone 40 and the second portable electronic device 70 must communicate with the second mobile phone 60. The first mobile phone 40 and the second mobile phone 60 can either communicate directly with one another, or may each communicate with the server 20 via the internet 15. If the server 20 is used, the server 20 facilitates communication between the first mobile phone 40 and the second mobile phone 60 since both the first portable electronic device 50 and the second portable electronic device 70 have been previously registered with the server 20.

In the description below, the first mobile phone 40 and the first portable electronic device 50 will primarily be used for explaining the operation of the present invention. Please note that the operation of the second mobile phone 60 and the second portable electronic device 70 will work in the same way, and will not be described for the sake of brevity.

Figure 3:
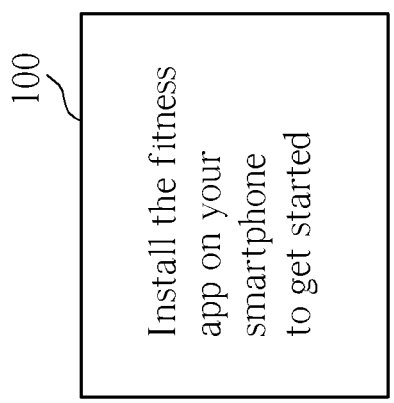
FIG. 3 shows a sample screen on the first portable electronic device instructing a user to install the fitness application on the first mobile phone in order to establish a connection between the first portable electronic device and the first mobile phone.

Please refer to FIG. 3. FIG. 3 shows a sample screen 100 on the first portable electronic device 50 instructing a user to install the fitness application on the first mobile phone 40 in order to establish a connection between the first portable electronic device 50 and the first mobile phone 40. Once this connection is established, the user of the first portable electronic device 50 can use the first portable electronic device 50 to instruct the first mobile phone 40 to send fitness data and navigational data to the first portable electronic device 50. The first mobile phone 40 can send navigational instructions, such as turn-by-turn instructions, to the user of the first portable electronic device 50. Additionally, a map of the current exercise route can be displayed on the display 52 of the first portable electronic device 50.

Figure 4:
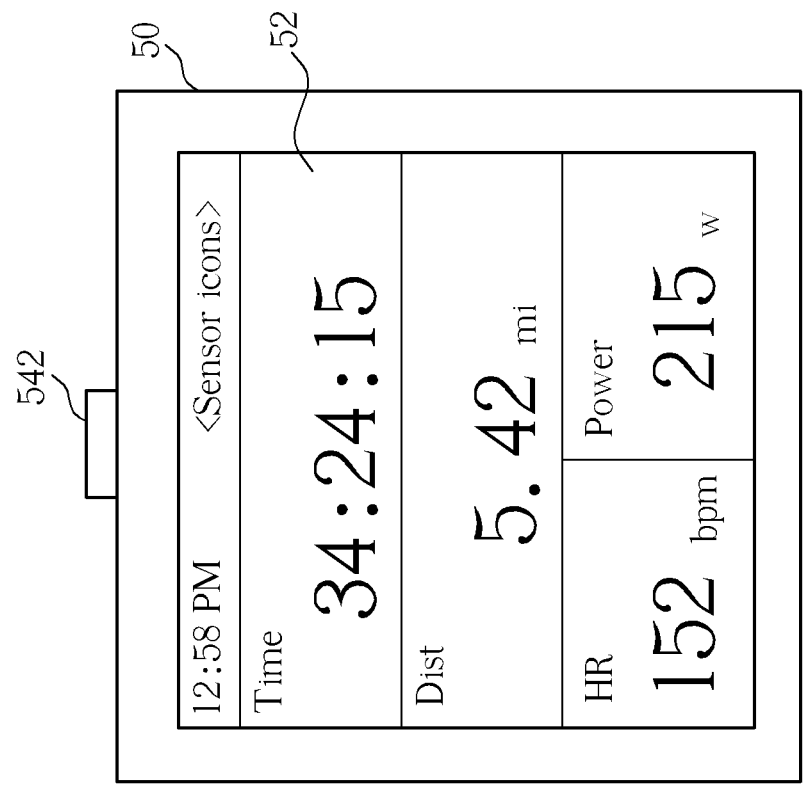
FIG. 4 shows a user interface of the first portable electronic device.

Please refer to FIG. 4. FIG. 4 shows a user interface of the first portable electronic device 50. The user of the first portable electronic device 50 can input commands using either a button 542 or through the display 52 so long as the display 52 is a touch-sensitive display. For instance, pressing the button 542 may wake the first portable electronic device 50 if the first portable electronic device 50 is in a sleep mode, or may toggle a backlight of the display 52 on and off. The backlight may also be activated for a short amount of time before turning off automatically.

Other actions that may be performed by either pressing the button 542 or tapping the display 52 include cycling through the various activity data pages to present data to the user in different formats, closing pop-up alerts, or accepting a pairing between the first portable electronic device 50 and the first mobile phone 40.

The first portable electronic device 50 acts as an extension of the first mobile phone 40, and allows the user to perform simple actions without needing to take out the first mobile phone 40, turn on the display device 420 of the first mobile phone 40, and then performing an action with the first mobile phone 40. The first portable electronic device 50 can be worn as a wristwatch or can be worn in another location that is easily accessible to the user.

One of the main purposes of the first portable electronic device 50 is to display real-time fitness data that is measured and generated by the first mobile phone 40. The processor 416 can generate the fitness data based on data provided by the GPS module 402. For instance, the GPS module 402 of the first mobile phone 40 receives position signals of the first mobile phone 40, and can thereby determine a distance that the user has moved while traveling along an exercise route. A clock of the first mobile phone 40 can also calculate the time that the user has been exercising along the exercise route. Using a combination of the distance and time, an average speed can be calculated as well. Other data can also be collected, such as elevation gain along an exercise path and the user's heart rate that can be measured along the exercise route. The heart rate can be measured using a heart rate monitor that is connected to the first mobile phone 40 in a wireless or wired manner. The user can wear the heart rate monitor for measuring the heart rate in beats per minute or other such metric.

Referring back to FIG. 4, data shown on the display 52 includes the exercise time, the distance traveled while exercising, the user's current heart rate (HR), and the user's power exerted while exercising. The user's power can instead be expressed in terms of energy or calories burned over the course of the exercise route. The display 52 preferably displays between one and six fields of data at one time on an activity data page. Each activity data page includes a status bar at the top of the screen showing the time of day as well as any sensor icons that indicate which sensors are currently connected to the first mobile phone 40. These sensors include an internal sensor of the first mobile phone 40 such as the GPS module 402, or external sensors such as a heart rate monitor, a foot pod, other cadence sensors, a power meter, and so on. The user is able to select which types of fitness data the user would like to see on the display 52 of the first portable electronic device 50, as well as to select the location of the different types of fitness data on the display 52.

Figure 5:
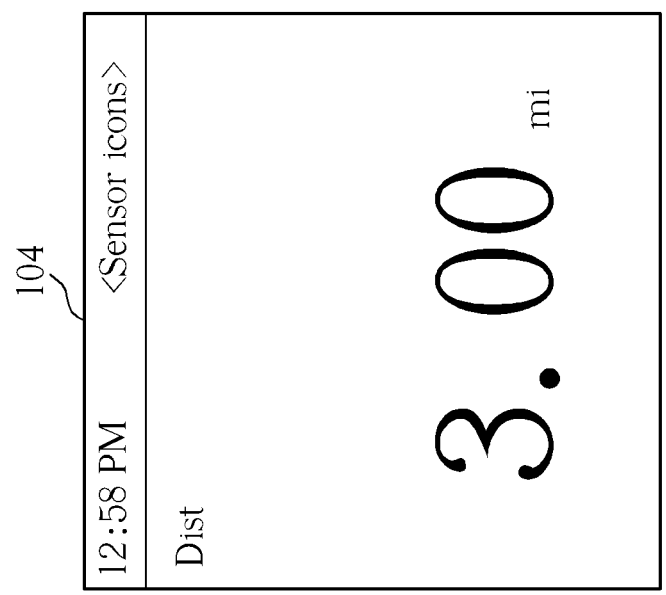
FIG. 5 is a screen on the first portable electronic device that shows a single field of fitness data.
Figure 6:
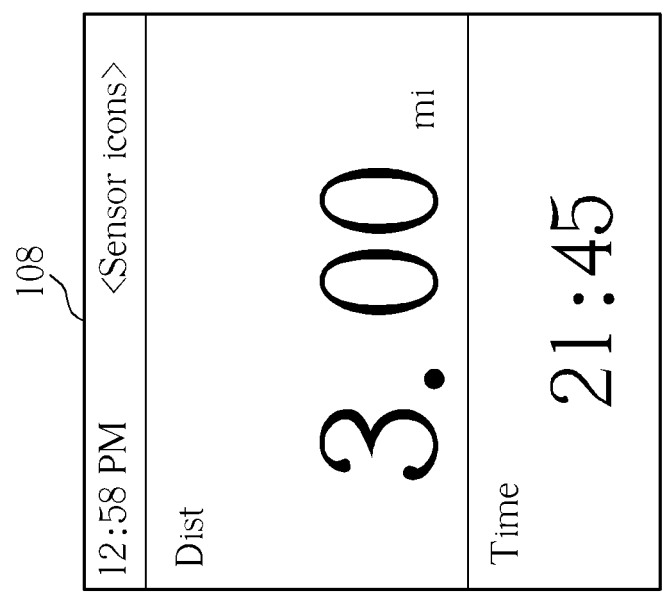
FIG. 6 is a screen on the first portable electronic device that shows two fields of fitness data.
Figure 9:
FIG. 9 is a screen on the first portable electronic device that shows five fields of fitness data.
Figure 10:
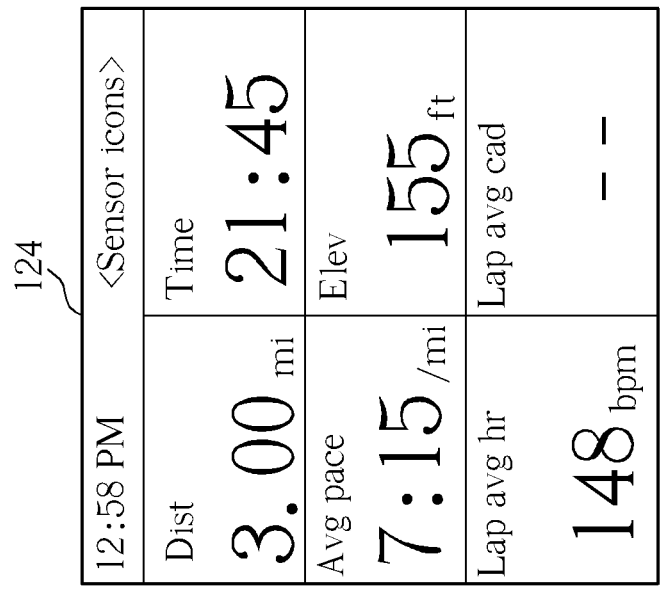
FIG. 10 is a screen on the first portable electronic device that shows six fields of fitness data.

Please refer to FIG. 5 to FIG. 10. FIG. 5 is a screen 104 on the first portable electronic device 50 that shows a single field of data for indicating the distance that the user has traveled on an exercise route. FIG. 6 is a screen 108 on the first portable electronic device 50 that shows two fields of data for indicating the distance as well as the time that that the user has traveled on the exercise route. FIG. 7 is a screen 112 on the first portable electronic device 50 that shows three fields of data for indicating the distance and time that the user has traveled on the exercise route as well as the user's average pace. FIG. 8 is a screen 116 on the first portable electronic device 50 that shows four fields of data for indicating the distance, time, and pace of the exercise route as well as the elevation gained. FIG. 9 is a screen 120 on the first portable electronic device 50 that shows five fields of data for indicating the distance, time, and pace, and elevation gain of the exercise route as well as the average heart rate for each lap that the user has completed when running one or more laps in an exercise route. FIG. 10 is a screen 124 on the first portable electronic device 50 that shows six fields of data for indicating the five metrics shown in FIG. 9 as well as an average lap cadence that can be shown for measuring a user's average cadence over one or more laps.

Figure 11:
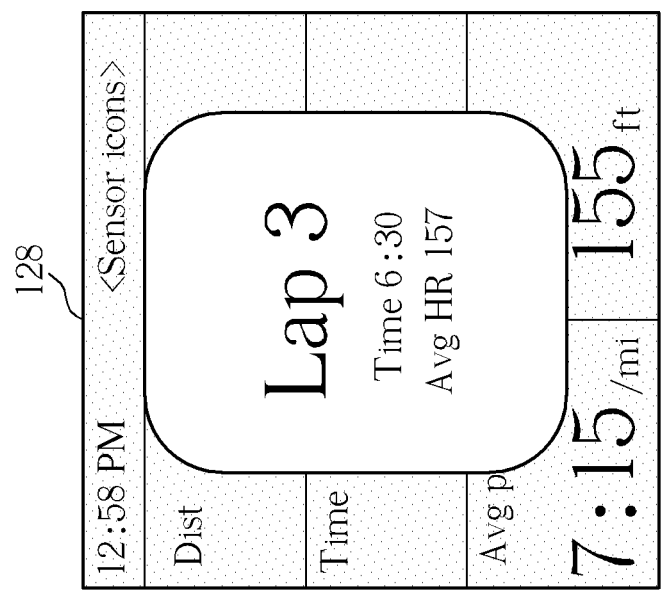
FIG. 11 is a screen showing a fitness alert indicating the user's current fitness statistics after a milestone has been reached.
Figure 12:
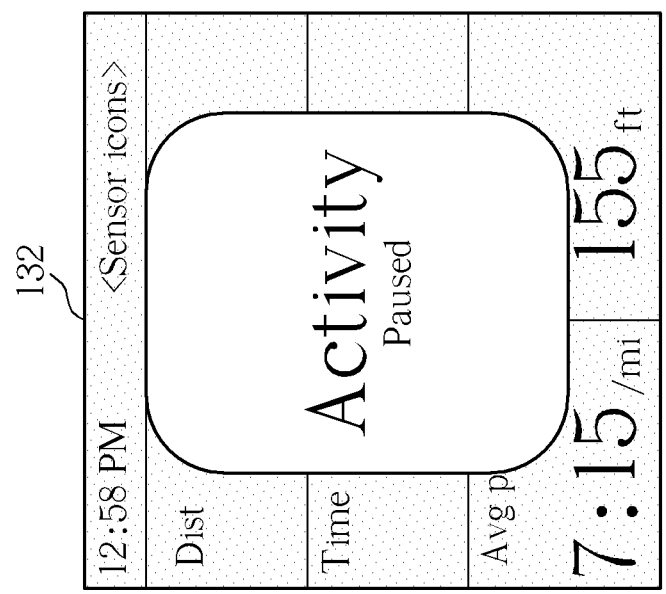
FIG. 12 is a screen showing a status alert for the first portable electronic device.

Please refer to FIG. 11 and FIG. 12. FIG. 11 is a screen 128 showing a fitness alert indicating the user's current fitness statistics after a milestone has been reached. In this example, after the user has completed a third lap of an exercise route the user is presented with data corresponding to the third lap. A time of "6:30" is shown as well as an average heart rate of 157 beats per minute. FIG. 12 is a screen 132 showing a status alert for the first portable electronic device 50. In this example, the alert shown is that the activity is paused, meaning that the user has issued a control command to the first portable electronic device 50, which in turn issues a command to the first mobile phone 40, to temporarily stop recording exercise data. The user may wish to pause activity when the user is taking a break while exercising. All alerts can be shown as pop-up text alerts shown on the display 52 or can be in the form of audio alerts.

In addition to displaying exercise data on the first portable electronic device 50, the first portable electronic device 50 can also be used to communicate with others. For instance, the user can receive, or even send text messages such as Short Message Service (SMS) messages to others. In addition, the user of the first portable electronic device 50 can send a message to the user of the second portable electronic device 70, and vice versa. The message can include ordinary text or can include fitness information that one user wishes to share with another user. For example, if the first portable electronic device 50 receives fitness information from a friend, the fitness information can be shown along with the friend's name on the display 52 of the first portable electronic device 50. Fitness information that can be shared includes statistics such as speed, distance, time, and heart rate. If the hardware of the first portable electronic device 50 is upgraded to support telephone calls, the first portable electronic device 50 can also be used to make and receive phone calls.

As mentioned above, any data being sent from the first portable electronic device 50 to the second portable electronic device 70 must first go through the first mobile phone 40, the server 20, and the second mobile phone 60 before being delivered to the second portable electronic device 70. The server 20 can be omitted if the first mobile phone 40 communicates directly with the second mobile phone 60. Communication between the first portable electronic device 50 and the second portable electronic device 70 or other such devices can be encrypted if desired in order to prevent unauthorized users from obtaining the transmitted data.

Fitness groups can also be created and registered with the server 20. The fitness group can be used for sharing route information, meeting times and respective locations, and for sharing fitness data among the group members.

Figure 13:
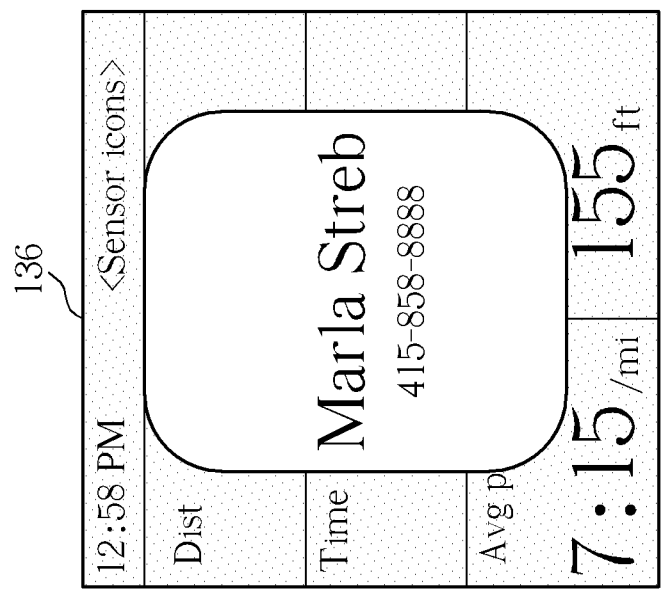
FIG. 13 is a screen showing a call alert on the first portable electronic device.
Figure 14:
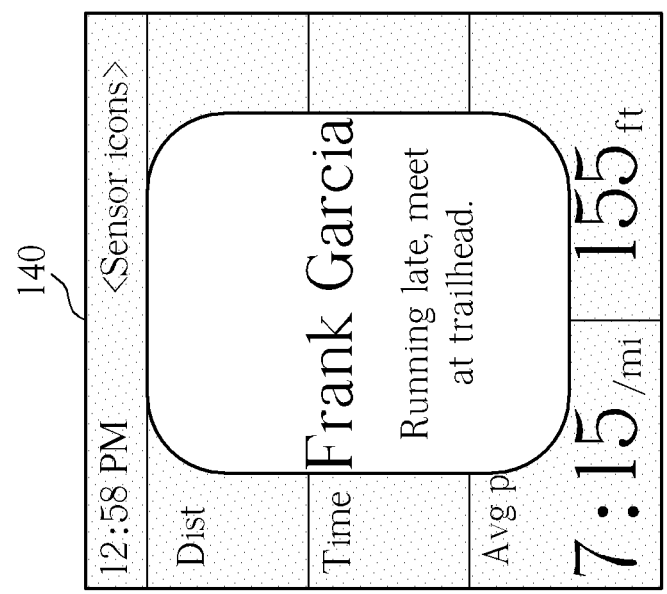
FIG. 14 is a screen showing a text message alert on the first portable electronic device.

Please refer to FIG. 13 and FIG. 14. FIG. 13 is a screen 136 showing a call alert on the first portable electronic device 50. The call alert indicates the name and the phone number of the person calling the first mobile phone 40. The user of the first portable electronic device 50 can then decide if they wish to take the call. FIG. 14 is a screen 140 showing a text message alert on the first portable electronic device 50. Since text can easily be shown on the display 52 of the first portable electronic device 50, the user can read the text message on the first portable electronic device 50 without needing to get out the first mobile phone 40. In order to alert the user as quickly as possible, the first mobile phone 40 will actively send the call alert or the message alert to the first portable electronic device 50 when receiving a phone call or a message.

The first portable electronic device 50 can also be used for other functions, such as providing an easy way for the user of the first portable electronic device 50 to notify emergency contacts or emergency services under certain urgent situations. The emergency message could be sent out by the user simply tapping the first portable electronic device 50, such as double-tapping or pressing the display of first portable electronic device 50 longer than a predetermined time. Since the user is already wearing the first portable electronic device 50, the user does not need to spend time retrieving the first mobile phone 40, and can instead quickly send out a duress signal using the user interface of the first portable electronic device 50. The emergency contact information can be stored in the mass data storage device 30 along with other user data.

In summary, the present invention fitness system 10 with the first portable electronic device 50 being separate and independent from the first mobile phone 40 provides many advantages over the prior art method of using only a mobile phone to track fitness data. First of all, the user of the first portable electronic device 50 does not need to take out the first mobile phone 40 in order to check fitness data or to check for received calls or messages. This will increase the user's interest in the fitness numbers and make it more likely for the user to want to continue exercising with the first portable electronic device 50. At the same time, the first portable electronic device 50 will reduce the chances of the user missing an important phone call or message since the user can be notified via the first portable electronic device 50 that the user is already wearing. The ease in which emergency contacts can be notified in the event of an emergency is also a significant advantage that the first portable electronic device 50 has over using only a mobile phone while exercising. Furthermore, the user of the first portable electronic device 50 can issue commands for controlling the first mobile phone 40 to start and stop recording fitness data, thereby saving the user time in having to retrieve the first mobile phone 40 from its storage location.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of displaying fitness data on a first portable electronic device wearable on a user in communication with a first mobile phone carried by the same user, the first portable electronic device being separate from the first mobile phone, the method comprising:
    storing a database in a memory of the first mobile phone, the database comprising geographic data;
    receiving, with the first mobile phone, position signals indicating a current position of the first mobile phone;
    measuring and generating real-time fitness data on the first mobile phone according to position signals received by the first mobile phone over time;
    transmitting wirelessly a request from the first portable electronic device to the first mobile phone for requesting fitness data to be sent from the first mobile phone to the first portable electronic device, the first portable electronic device not having the ability to measure or generate fitness data directly;
    transmitting requested fitness data from the first mobile phone to the first portable electronic device in response to the request received by the first mobile phone; and
    displaying the requested fitness data on a display of the first portable electronic device.

2. The method of claim 1, further comprising the first portable electronic device communicating with a second portable electronic device via the first mobile phone and a second mobile phone, wherein the first portable electronic device exchanges data with the first mobile phone, the first mobile phone exchanges data with the second mobile phone, and the second mobile phone exchanges data with the second portable electronic device.

3. The method of claim 2, wherein the first mobile phone and the second mobile phone communicate with each other directly or communicate via a server.

4. The method of claim 2, further comprising the first portable electronic device exchanging messages or fitness data statistics with the second portable electronic device.

5. The method of claim 1, further comprising:
    registering a fitness group with a server, the fitness group comprising a plurality of members including at least the first portable electronic device;
    sending a message from one member of the fitness group to other members of the fitness group via the server in order to share data among the members of the fitness group, wherein the data comprises shared route information, meeting times, respective locations, and fitness data.

6. The method of claim 1, further comprising the first mobile phone actively sending a call alert to the first portable electronic device when the first mobile phone receives a phone call, and the first mobile phone actively sending a message alert to the first portable electronic device when the first mobile phone receives a message.

7. The method of claim 1, further comprising:
    transmitting navigation data from the first mobile phone to the first portable electronic device; and
    displaying the navigation data on the display of the first portable electronic device.

8. The method of claim 1, wherein generating fitness data on the first mobile phone according to position signals received by the first mobile phone over time comprises generating fitness data related to speed or distance of the user of the first mobile phone.

9. The method of claim 1, wherein the first portable electronic device communicates with the first mobile phone wirelessly according to the ANT+ wireless protocol or the Bluetooth low energy (BLE) wireless protocol.

10. The method of claim 1, further comprising activating an alarm function on the first portable electronic device for triggering an emergency call to be made or an emergency message to be sent from the first mobile phone.

11. A fitness system, comprising:
    a first mobile phone carried by a user, comprising:
        a memory storing a database comprising geographic data;
        a position receiving device receiving position signals indicating a current position of the first mobile phone; and
        a processor measuring and generating real-time fitness data according to position signals received by the position receiving device over time; and
    a first portable electronic device wearable on the same user and being separate from the first mobile phone, the first portable electronic device comprising:
        a user interface issuing a request for fitness data to be transmitted wirelessly from the first mobile phone to the first portable electronic device, the first portable electronic device not having the ability to measure or generate fitness data directly; and
        a display for displaying requested fitness data after the requested fitness data is transmitted from the first mobile phone to the first portable electronic device in response to the request issued by the user interface.

12. The fitness system of claim 11, further comprising:
    a second mobile phone; and
    a second portable electronic device;
    wherein the first portable electronic device communicates with the second portable electronic device via the first mobile phone and the second mobile phone, the first portable electronic device exchanges data with the first mobile phone, the first mobile phone exchanges data with the second mobile phone, and the second mobile phone exchanges data with the second portable electronic device.

13. The fitness system of claim 12, further comprising a server, wherein the first mobile phone and the second mobile phone communicate with each other directly or communicate via the server.

14. The fitness system of claim 12, wherein the first portable electronic device exchanges messages or fitness data statistics with the second portable electronic device.

15. The fitness system of claim 11, wherein a fitness group is registered with a server, the fitness group comprising a plurality of members including at least the first portable electronic device, and members of the fitness group send messages to other members of the fitness group via the server in order to share data among the members of the fitness group, wherein the data comprises shared route information, meeting times, respective locations, and fitness data.

16. The fitness system of claim 11, wherein the first mobile phone actively sends a call alert to the first portable electronic device when the first mobile phone receives a phone call, and the first mobile phone actively sends a message alert to the first portable electronic device when the first mobile phone receives a message.

17. The fitness system of claim 11, wherein the first mobile phone transmits navigation data to the first portable electronic device, and the first portable electronic device displays the navigation data on the display of the first portable electronic device.

18. The fitness system of claim 11, wherein the processor generating fitness data on the first mobile phone according to position signals received by the position receiving device over time comprises generating fitness data related to speed or distance of the user of the first mobile phone.

19. The fitness system of claim 11, wherein the first portable electronic device comprises a wireless module and the first mobile phone comprises a wireless transceiver, and the first portable electronic device communicates with the first mobile phone wirelessly via the wireless module and the wireless transceiver.

20. The fitness system of claim 19, wherein the first portable electronic device communicates with the first mobile phone according to the ANT+ wireless protocol or the Bluetooth low energy (BLE) wireless protocol.

21. The fitness system of claim 11, wherein the user interface of the first portable electronic device comprises an alarm function for triggering an emergency call to be made or an emergency message to be sent from the first mobile phone.

\* \* \* \* \*